United States Patent Office 3,348,417
Patented Oct. 24, 1967

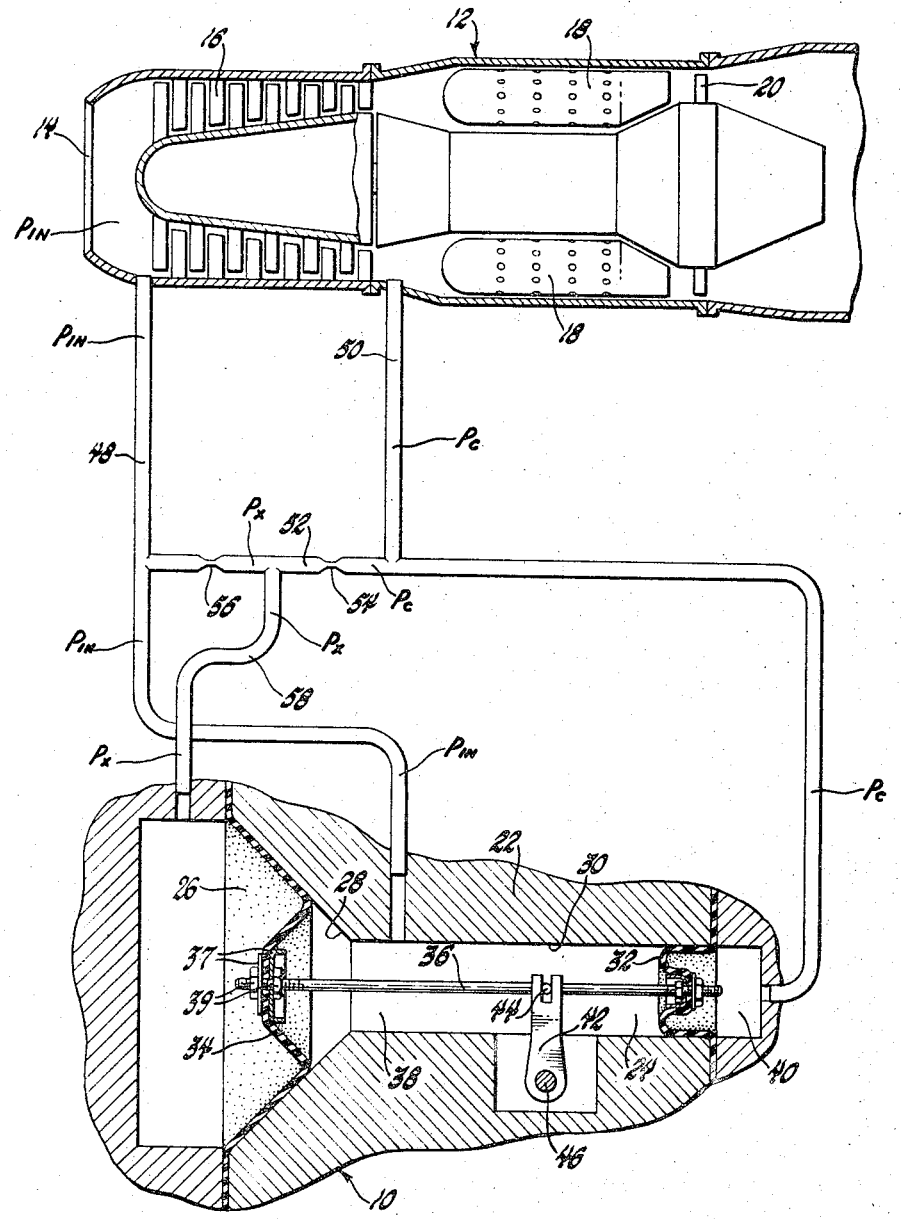

3,348,417
PRESSURE RATIO SENSOR
Alan Hitzelberger, Grand Blanc, Mich., assignor to General Motors Corporation, Detroit, Mich., a corporation of Delaware
Filed Jan. 28, 1965, Ser. No. 428,696
6 Claims. (Cl. 73—407)

ABSTRACT OF THE DISCLOSURE

A device in which two sources of pressure are connected through two series orifices to develop an intermediate pressure and the three pressures are exerted on two physically coupled diaphragms, one converging with displacement, so as to indicate the ratio of the source pressures.

Specification

This invention relates to a pressure measuring device and more particularly to a pressure ratio sensor for measuring the pressure ratio across a given system.

The subject pressure ratio sensor has use both as a pressure indicating device and as an actuator to control variables which are concerned with pressure change.

The subject pressure ratio sensor includes a housing which contains a long cylindrical chamber and a diverging conical chamber. Located within the cylindrical chamber is a fixed area rolling diaphragm which divides this chamber into two portions. Located within the diverging conical chamber is a variable area rolling diaphragm which resides along the diverging portion of this chamber and provides a dividing means between the cylindrical chamber and the conical chamber. The two diaphragms are connected by a transmission rod which in turn moves a lever arm which is pivoted about a fixed point. The two pressures which are to be measured are bled by means of conduits from their sources such that they are fed into the two portions of the cylindrical chamber. A cross-over conduit connects the two pressure source conduits and contains two fixed area orifices thereby creating an intermediate pressure between these two orifices. This intermediate pressure is connected by means of another conduit to the conical diverging chamber. The lever connected to the transmission rod will reach a certain position upon the balancing of the pressure forces on the diaphragms and this lever can be used as an indicating device or it can be used to control a device such as a fuel control.

It is, therefore, an object of the subject invention to provide a pressure ratio sensor to measure the pressure change across a given system which is both simple in structure and accurate in operation.

Other objects and features of the subject invention and the complete operation thereof will become clear upon reference to the succeeding detailed description and the drawing depicting the preferred embodiment thereof, wherein:

The figure shows the subject pressure ratio sensor as applied to measure the pressure ratio across the compressor of a gas turbine engine.

Specifically the drawing shows a pressure ratio sensor 10 as adapted for use with a gas turbine engine 12. It should be made clear, however, that the subject pressure ratio sensor 10 has many uses and applications and that its application to the compressor of the gas turbine engine is merely an example of a preferred embodiment. The gas turbine engine 12 is of a standard type with a a compressor air inlet 14, a compressor 16, a combustion chamber 18, and a gas turbine 20. The operation of such an engine will not be discussed in detail as it is well known that the air is compressed in the compressor, ignited and burned with fuel in the combustion chamber, and expanded out through the turbine.

The main part of the subject invention, the pressure ratio sensor 10, is located in housing 22. The sensor 10 comprises a long cylindrical chamber 24 and a diverging conical chamber 26. The diverging chamber 26 has a diverging side wall 28 which connects with the side wall 30 of the cylindrical chamber 24 to provide an opening between the two chambers 24 and 26. A fixed area rolling diaphragm 32 is secured within the side wall 30 of the cylindrical chamber 24 and extends across the chamber 24 to divide it into two portions 38 and 40. A variable area rolling diaphragm 34 is secured within the side wall 28 and rests along this wall on the side of the chamber 26. A transmission rod 36 fastened at its ends to each of the diaphragms 32 and 34 provides a positive mechanical connection between the two diaphragms. The transmission rod 36 is fastened to the diaphragms 32 and 34 by suitable means such as a pair of washers 37 and nuts 39 which are threaded on the ends of the transmission rod 36. Thus, it can be seen that the pressure ratio sensor contains three separate, variable volume chambers 26, 38, and 40. Connected to the transmission rod 36 and movable therewith is a lever 42. The lever 42 is connected to the transmission rod 36 by suitable means 44 so that it can move with the transmission rod 36 and pivot about its pivot point 46.

A conduit 48 extends from the compressor air inlet 14 to the chamber 38 thereby conducting air at the pressure of the compressor inlet to this chamber 38. Another conduit 50 connects the outlet of the compressor 16 with the chamber 40 such that it conducts air at the compressor discharge pressure to the chamber 40. A cross-over conduit 52 connecting the compressor discharge conduit 50 and the compressor inlet conduit 48 contains a pair of orifices 54 and 56. Hence, the portion of the cross-over connection 52 which is between the orifices 54 and 56 contains fluid at a pressure intermediate to the inlet pressure and the compressor discharge pressure. A conduit 58 is provided to conduct this fluid at the intermediate pressure to the chamber 26.

Operation

As the engine increases its speed, the pressure ratio across the compressor 16 rises and some air is bled from the compressor discharge conduit 50 through the conduit 52 and orifices 54 and 56. As a result, an intermediate pressure is created in the conduit 52 between the orifices 54 and 56. For the purposes of our discussion, hereinafter the compressor discharge pressure in conduit 50 will be called Pc, the compressor inlet in conduit 48 will be Pin, and the intermediate pressure occurring in conduit 52 between the orifices 54 and 56 will be labelled Px. The pressure ratio of Px to Pin is a known value for each pressure ratio of Pc to Pin because of the well known action of two orifices in series. This known action is such that the ratio of intermediate pressure Px to Pc is a function of the pressure ratio of Pc to Pin and the ratio of the areas of the orifices 54 and 56. Thus when the ratio of the areas of the orifices 54 and 56 or the ratio of Pc to Pin changes, the intermediate pressure Px also changes. However, there is a definite ratio of Px to Pin for each ratio of Pc to Pin and for each orifice area ratio. The orifice ratio remains constant in operation of the device, as each orifice remains fixed. As described before, the compressor discharge pressure Pc is connected through conduit 50 to one side of the fixed area rolling diaphragm 32 and the conpressor inlet pressure Pin is connected to the other side through conduit 48. As the pressure ratio increases to a particular Pc to Pin value, the force unbalance across the fixed area rolling diaphragm 32 increases and tends to move the rod 36 and the variable area diaphragm 34 to the left. The motion of the variable area diaphragm 34 to the left causes it to move away from tapered bore 28 of the chamber 26 and exposes an increasing area of the diaphragm 34 to the pressure differential P$x$–P$in$. As described before, the intermediate pressure P$x$ is connected to the chamber 26 through conduit 58. The rod 36 and diaphragm assembly then continue to move to the left until the variable area diaphragm 34 increases its effective area sufficiently so that the pressure differential P$x$–P$in$ produces a force to the right on the diaphragm and rod assembly which equals the force to the left. At this point, the motion stops and the rod 36 remains at a unique position for that particular pressure ratio. This unique position will be obtained regardless of the operating altitude as long as the pressure ratio of P$c$ to P$in$ is the same value as described above. Thus, it may be seen that for each given pressure ratio of P$c$ to P$in$, which in this case is the pressure ratio across the compressor 16, a unique position of the rod 36 is obtained due to the variable area rolling diaphragm 34 seeking an area which will cause a force balance on the connecting rod. The output of the mechanism may be connected to a lever and shaft as illustrated for purposes of actuating other variables or merely for indicating purposes on a dial. Additionally, it is possible to adjust the area ratio of the two orifices 54 and 56 such that the sensor will reach its maximum stroke at some predetermined pressure ratio P$c$ to P$in$ across the compressor. This adjustment may be in the form of a needle valve substituted for one of the two fixed orifices.

Thus, it can be seen that the subject invention provides a pressure ratio sensor for measuring the pressure difference between two points which is relatively simple in structure and yet accurate so that its output can be used as an indicating device or as an actuating device for controlling other variables.

A feature of my pressure ratio sensor which is quite significant from a practical standpoint is that it does not require evacuated bellows to measure pressure ratio undisturbed by altitude changes. Bellows are expensive and subject to vibration and fatigue failures.

Although the subject invention has been illustrated in connection with its use in measuring the pressure ratio across a compressor, it should be clear to those skilled in the art to which the invention pertains that it has many other applications and uses and that many changes and modifications can be made thereto without departing from the scope of the invention.

I claim:
1. A pressure ratio sensor comprising:
   a first movable wall having a constant area;
   a second movable wall varying in area with displacement;
   means connecting said walls for movement together;
   high and low pressure sources;
   two orifices connected in series between said sources thus developing an intermediate pressure between said orifices;
   means to apply said high and low pressures to opposite sides of said first wall; and
   means to apply said intermediate and low pressures to opposite sides of said variable wall so as to oppose the pressure bias on said first wall.
2. A pressure ratio sensor as claimed in claim 1, wherein:
   said first movable wall is a fixed area rolling diaphragm on a cylindrical surface and said second movable wall is a variable area rolling diaphragm on a converging surface.
3. A pressure ratio sensor comprising, in combination,
   a movable structure comprising a first movable wall, a second movable wall, and means connecting said walls together for joint displacement of said walls and connecting means;
   means cooperating with said walls causing the ratio of the areas of said walls to vary with such displacement;
   a higher pressure fluid source;
   a relatively lower pressure fluid source;
   two orifices connected in series for flow between said sources to develop an intermediate pressure between said orifices;
   means to apply the said higher and lower pressures to opposite sides of the first movable wall; and
   means to apply the said intermediate and lower pressures to opposite sides of the second movable wall so as to oppose the force exerted on the first movable wall by the higher and lower pressures;
   the movable structure being substantially free from bias other than by the said pressures as recited so that the movable structure assumes a position determined by the ratio of the said higher and lower pressures.
4. A pressure ratio sensor as recited in claim 3 in which said movable walls are rolling diaphragms.
5. A pressure ratio sensor as recited in claim 4 in which one diaphragm rolls on a converging surface and the other diaphragm rolls on a cylindrical surface.
6. A pressure ratio sensor as recited in claim 3 in which the intermediate pressure is supplied to a chamber defined in part by the said movable walls.

References Cited

UNITED STATES PATENTS

| | | | |
|---|---|---|---|
| 2,948,116 | 8/1960 | Olander | 60—39.28 |
| 2,974,640 | 3/1961 | Lindbom et al. | |
| 3,130,740 | 4/1964 | Donlon | 60—39.28 |

LOUIS R. PRINCE, *Primary Examiner.*

W. O. WOODIEL, *Assistant Examiner.*